United States Patent
Fukuyama et al.

(10) Patent No.: US 6,223,561 B1
(45) Date of Patent: May 1, 2001

(54) PRESS MOLD FOR GLASS SUBSTRATE

(75) Inventors: Masashi Fukuyama, Komaki; Kazutoshi Tohyama, Nakatsugawa; Masahiro Maeda, Nagoya, all of (JP)

(73) Assignees: NGK Insulators, Ltd.; NGK Optoceramics, Ltd., both of Nagoya (JP)

( * ) Notice: Subject to any disclaimer, the term of this patent is extended or adjusted under 35 U.S.C. 154(b) by 0 days.

(21) Appl. No.: 09/272,113

(22) Filed: Mar. 19, 1999

(30) Foreign Application Priority Data

Mar. 31, 1998 (JP) .................................................. 10-087743
Mar. 2, 1999 (JP) .................................................. 11-054562

(51) Int. Cl.⁷ .................................................. C03B 11/12
(52) U.S. Cl. ................................ 65/319; 65/323; 65/355; 65/356; 100/258 A; 100/918; 425/406; 425/409
(58) Field of Search .............................. 65/258, 319, 323, 65/355, 356; 100/258 A, 918; 425/409, 406

(56) References Cited

U.S. PATENT DOCUMENTS

| | | | |
|---|---|---|---|
| 827,484 | * | 7/1906 | Wadsworth . |
| 1,381,591 | * | 6/1921 | Powell . |
| 3,200,454 | * | 8/1965 | Gramenzi . |
| 3,809,357 | * | 5/1974 | Gallap . |
| 4,555,258 | * | 11/1985 | Curiel . |
| 4,632,689 | * | 12/1986 | De Willegen et al. . |
| 4,698,089 | * | 10/1987 | Matsuzaka et al. . |
| 4,756,737 | * | 7/1988 | Yoshimura et al. . |
| 4,915,720 | * | 4/1990 | Hirota et al. . |

\* cited by examiner

Primary Examiner—Sean Vincent
(74) Attorney, Agent, or Firm—Burr & Brown

(57) ABSTRACT

A press mold for glass substrate includes an upper mold and a lower mold, and a pressure apparatus for applying pressure to the upper mold and the lower mold, for molding a plate-shaped glass substrate having a predetermined thickness between the upper mold and the lower mold. An engaging projected piece is projectingly provided on the side portion of the upper mold, an engaging projected piece supporting portion for supporting the engaging projected piece is provided on the side portion of the lower mold, and an end portion of the upper mold is formed so as to be released from the lower mold with the engaging projected piece as a rotating shaft. Variance in pressure on mold surfaces between the upper mold and lower mold is detected, and a buffer made of material having lower compressive yield strength than material constituting the lower mold is inserted between the lower mold and the pressure apparatus in a position corresponding to the mold surface portion at lower pressure. It is possible to prevent the molded object or the mold from being damaged, and to apply uniform pressure on an entire mold surface by eliminating pressure variance on the mold surface of the mold as far as possible, and therefore, a large glass substrate molded object of excellent quality can be molded.

3 Claims, 5 Drawing Sheets

PRESS MOLD FOR GLASS SUBSTRATE

BACKGROUND OF THE INVENTION AND RELATED ART

The present invention relates to a press mold for press molding a large plate-shaped glass substrate molded object, and a pressing method for the glass substrate.

As fiber alignment components, there are known fiber arrays which are used to connect fibers with other optical components, and MT connectors which are used to connect fibers with one another. These connecting optical components are fabricated using a glass substrate having fiber securing grooves. The molded object for a glass substrate having such grooves on its surface is generally molded using a press mold consisting of an upper mold and a lower mold.

That is, the glass substrate is fabricated by flowing molten glass material into a mold for press molding. In press molding for a plate-shaped glass substrate, the glass substrate is normally fabricated by means of a two-step molding process consisting of a first step of molding from molten glass to a plate-shaped glass substrate, and a second step of molding more precisely by re-heating the glass substrate obtained in the first step.

Here, in the case of molding a glass substrate having grooves on its surface as described above, in the second step, a so-called re-heat press process, molding is performed using a press mold consisting of an upper mold and a lower mold each having a groove-shaped mold surface. In recent years, a large glass substrate molded object has been requested in terms of operation efficiency and cost.

If, however, the glass substrate molded object is made as large as, for example, two inches or more in diameter, a tensile force of a fixed value or more is exerted between the molds and the glass substrate molded object when the mold is released after pressing, and as a result, the glass substrate molded object and the molds may be damaged. Also, when the glass substrate size is made larger and the thickness is made thinner, the tensile force tends to become larger.

The present invention has been achieved in the light of above-described conventional problem, and is aimed to provide a press mold for glass substrate and a pressing method capable of applying uniform pressure to an entire mold surface and thereby preventing a molded object or a mold from being damaged and eliminating variance in pressure on the mold surface of the mold as far as possible on molding a large glass substrate molded object.

SUMMARY OF THE INVENTION

According to the present invention, there is provided a press mold for a glass substrate comprising an upper mold and a lower mold, and pressure means for applying pressure to the upper mold and the lower mold, for molding a plate-shaped glass substrate having a predetermined thickness between the upper mold and the lower mold, wherein an engaging projected piece is projectingly provided on a side portion of the foregoing upper mold, an engaging projected piece supporting portion for supporting the engaging projected piece is provided on a side portion of the foregoing lower mold, and the end portion of the upper mold is formed so as to be released from the lower mold with the engaging projected piece as a rotating shaft.

Also, in the present invention, it is preferable that there is arranged a pressure member above the upper mold with a pressure intermediate plate interposed therebetween, and the central upper surface of the pressure intermediate plate is formed into a concave shape, and a spherical seat formed into such a convex shape as to correspond to the concave shape on the pressure intermediate plate is provided on the central lower surface of the pressure member.

Also, according to the present invention, there is provided a pressing method for a glass substrate for molding a plate-shaped glass substrate having a predetermined thickness between the upper mold and the lower mold by applying pressure to the upper mold and the lower mold through pressure means, wherein variance in pressure on mold surfaces in the foregoing upper mold and lower mold are detected, and a buffer made of material having lower compressive yield strength than material constituting the lower mold is inserted between the lower mold and the pressure means in a position corresponding to a mold surface portion at lower pressure.

BRIEF DESCRIPTION OF THE DRAWINGS

FIG. 2(a), FIG. 2(b) and FIG. 2(c) show states before pressing, during pressing and during mold release after pressing, respectively;

FIG. 3(a), FIG. 3(b) and FIG. 3(c) show states immediately after pressing, at the beginning of mold release and when the upper mold leaves the glass material, respectively;

DETAILED DESCRIPTION OF THE PREFERRED EMBODIMENT

Hereinafter, with reference to the drawings, the detailed description will be made of an embodiment according to the present invention.

Figure 1:
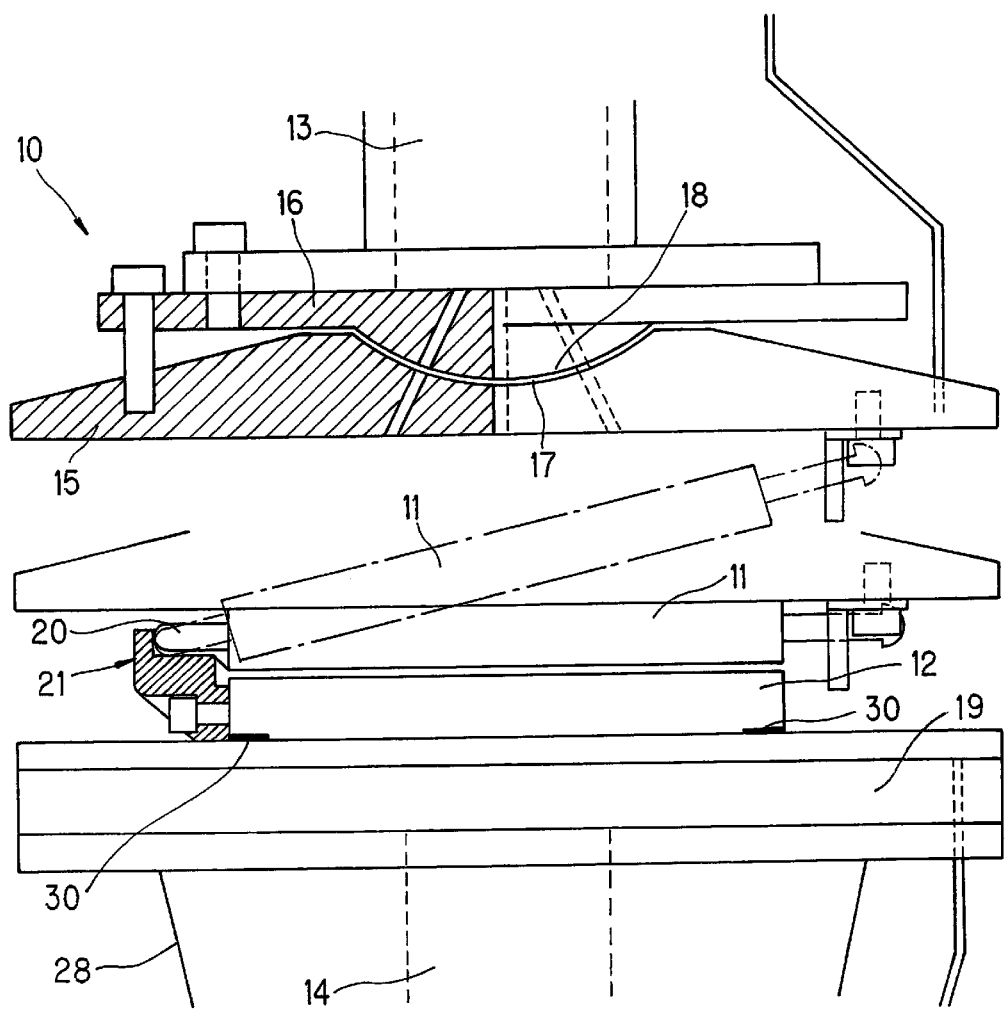
FIG. 1 is a cross-sectional structural view showing an embodiment of a press mold for glass substrate according to the present invention.

FIG. 1 is a cross-sectional structural view showing an embodiment of a press mold for glass substrate according to the present invention.

In FIG. 1, a press mold 10 has an upper mold 11, a lower mold 12, and pressure shafts 13, 14 of pressure means for applying pressure to the upper mold 11 and the lower mold 12. Above the upper mold 11, there is provided a pressure member 16 with a pressure intermediate plate 15 interposed therebetween, and the pressure member 16 is coupled to the foregoing pressure shaft 13. The pressure intermediate plate 15 has a concave portion 17 formed on the central upper surface thereof, and a convex portion of a spherical seat 18 provided on the central lower surface of the pressure member 16 is engaged with the concave portion 17.

Even if there is any deviation in parallelism between the upper mold 11 and the lower mold 12, the above-described structure allows a fitted portion between the concave portion 17 on the pressure intermediate plate 15 and the convex portion of the spherical seat 18 to absorb the deviation, thus preventing the thickness of the glass substrate from becoming uneven.

In this respect, when a taper-shaped coupling member 28 is provided under the lower mold 12 with the lower surface plate 19 interposed therebetween, even if there is any strain resulting from the lower mold 12 and the lower surface plate 19 having inferior flatness/parallelism, this strain can be absorbed, and therefore it is preferable to provide the taper-shaped coupling member 28.

Also, in the upper mold 11 according to the present invention, an engaging projected piece 20 is projectingly provided on the side portion thereof, and, on the side portion of the lower mold 12, there is provided an engaging projected piece supporting portion 21 which does not fix, but supports the engaging projected piece 20 of the upper mold 11 from below and the side portion thereof. Thus, during mold release after pressing, the end portion of the upper mold 11 on the other side of the engaging projected piece 20 is caused to be released from the lower mold 12 with the engaging projected piece 20 as a rotating shaft.

Hereinafter, with reference to FIGS. 2(a), (b) and (c), FIGS. 3(a), (b) and (c), and FIG. 4, the description will be made of the structure of the upper mold and lower mold, and the operation of the upper mold and lower mold during pressing and during mold release.

Figure 2A:
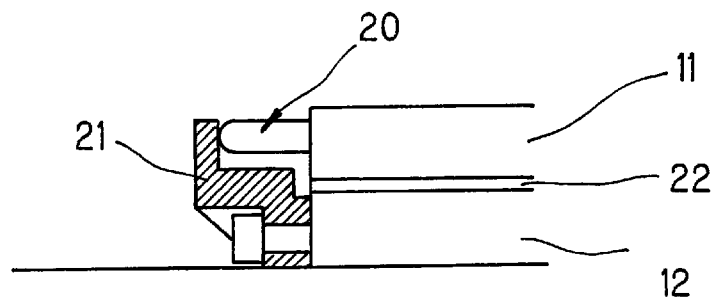
FIGS. 2(a), (b) and (c) are side explanatory views schematically illustrating operations of a press mold according to the present invention.

FIG. 2(a) shows a state before pressing, and a plate-shaped glass material 22 is arranged between the upper mold 11 and the lower mold 12. In this state, as shown in FIG. 4, the distal end of the engaging projected piece 20 is in contact with the side portion 24 of the engaging projected piece supporting portion 21, but the lower portion 26 of the engaging projected piece 20 is not in contact with the base 25 of the engaging projected piece supporting portion 21. Also, the engaging projected piece 20 is not fixed to the engaging projected piece supporting portion 21.

Figure 2B:
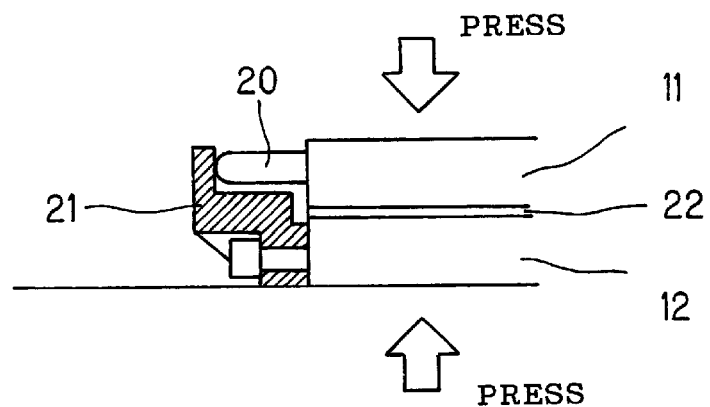

In this state, the upper mold 11 and the lower mold 12 are pressed from above and from below as shown in FIG. 2(b) to make a multiplicity of grooves on the surfaces of a molded object for glass substrate.

Figure 2C:
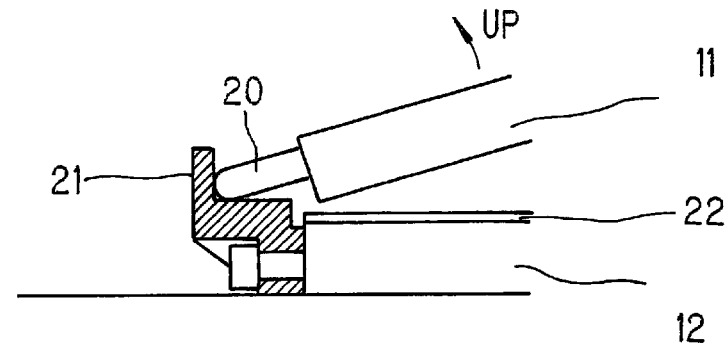

After the pressing is terminated, the upper mold 11 is lifted upward (retracted) as shown in FIG. 2(c) to thereby mold release, and the operation of the upper mold during the mold release will be described with reference to FIGS. 3(a), (b) and (c) and FIG. 4.

Figure 3A:
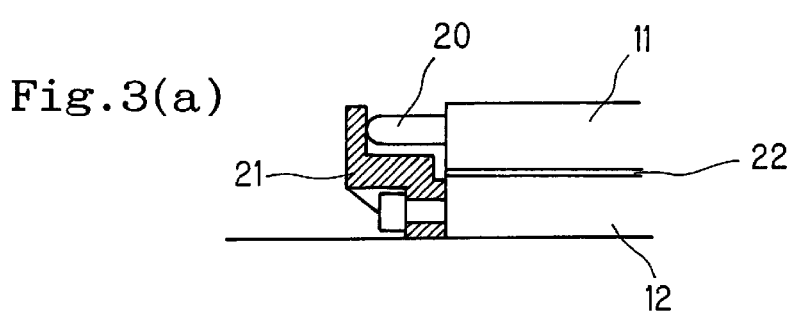
FIGS. 3(a), (b) and (c) are side explanatory views schematically illustrating a retracting operation of an upper mold according to the present invention.
Figure 3B:
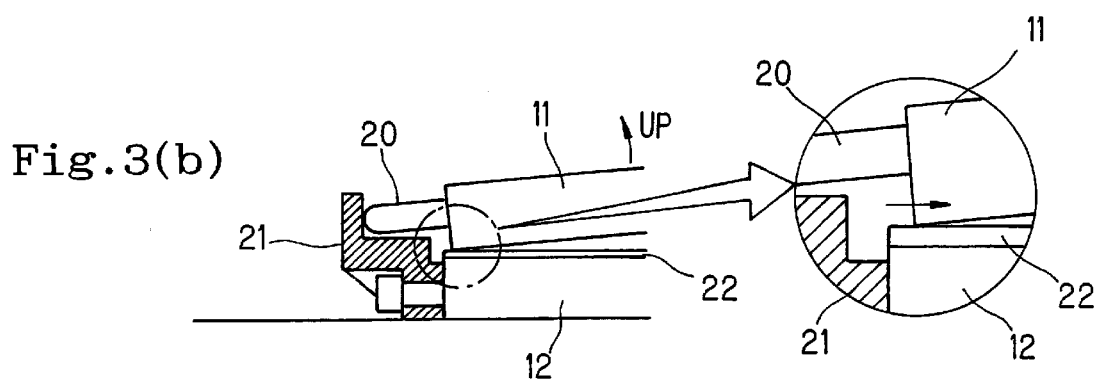
Figure 3C:
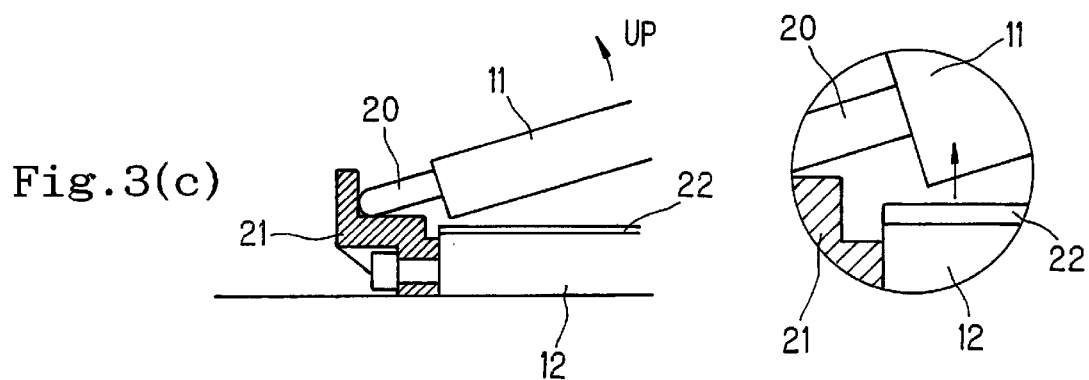
Figure 4:
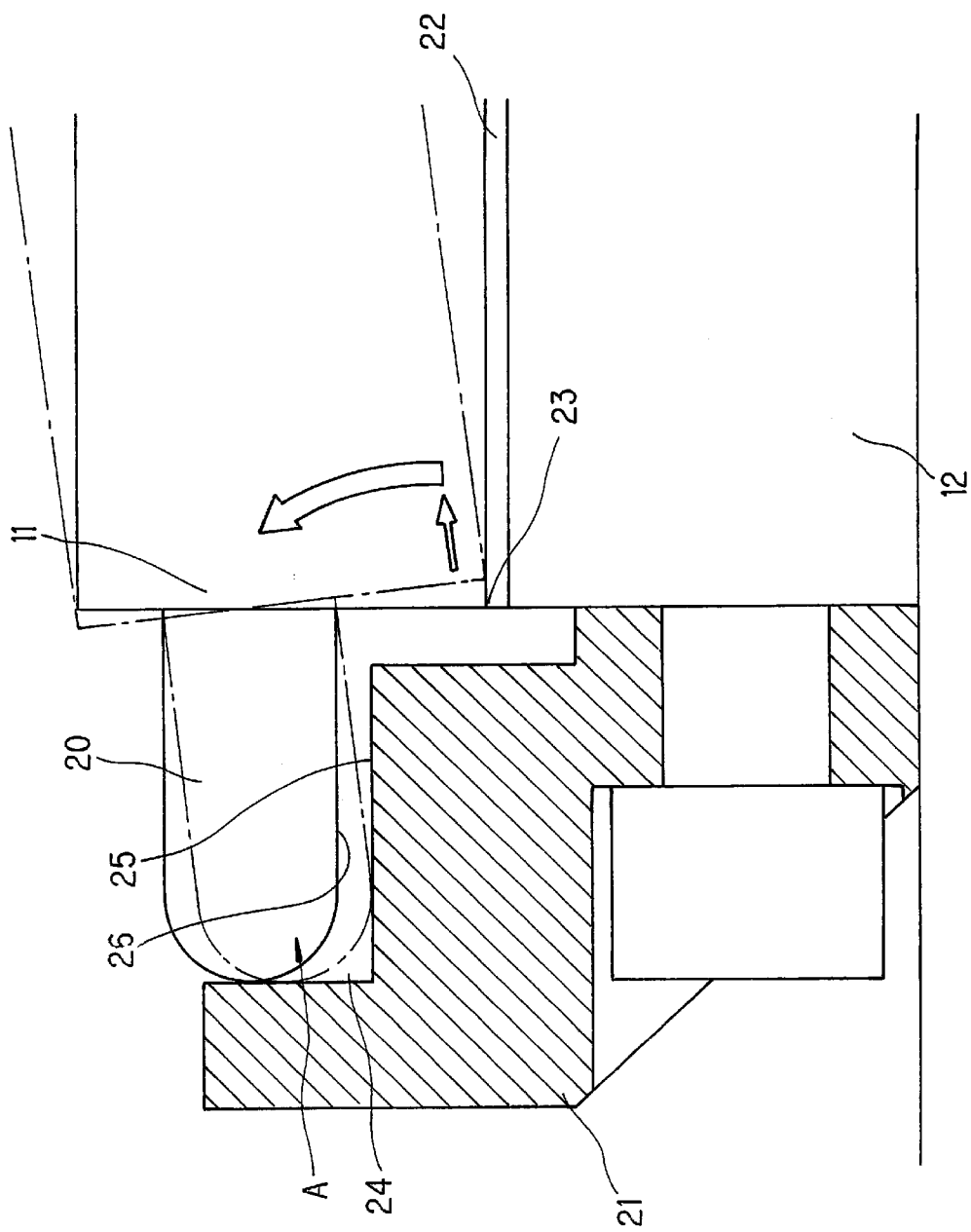
FIG. 4 is a partial enlarged view for FIG. 3(b)

FIG. 3(a) shows a state when the pressing is terminated, and next, the end portion of the upper mold 11 on the other side of the engaging projected piece 20 is lifted upward with the engaging projected piece 20 as the rotating shaft as shown in FIG. 3(b) to release from the lower mold 12. At this time, as shown in the enlarged view of FIG. 4, the rotating shaft of the upper mold 11 is a lower edge portion 23 of the side portion of the upper mold 11 at the beginning of the mold release, and as the end portion of the upper mold 11 on the other side of the engaging projected piece 20 lifts upward, the lower edge portion 23 of the side portion of the upper mold 11, which is the rotating shaft, moves to the right in, as shown the figure, while it is sliding on the upper surface of the glass material 22. At this time, the lower edge portion 23 of the side portion of the upper mold 11 does not leave the upper surface of the glass material 22.

Next, as the end portion of the upper mold 11 on the other side of the engaging projected piece 20 lifts upward, the distal end portion of the engaging projected piece 20 abuts the base 25 of the engaging projected piece supporting portion 21 and ceases the downward movement while it is sliding downward in contact with the side portion 24 of the engaging projected piece supporting portion 21.

When the end portion of the upper mold 11 on the other side of the engaging projected piece 20 further lifts upward in a state in which the distal end portion of the engaging projected piece 20 cannot move downward and sideways by the side portion 24 and the base 25 of the engaging projected piece supporting portion 21, a distal end portion A of the engaging projected piece 20 serves as the rotating shaft and the upper mold 11 lifts upward. Therefore the lower edge portion 23 of the side portion of the upper mold 11 also leaves the upper surface of the glass material 22 at this time.

In a press mold according to the present invention, since the upper mold is not lifted upward in the vertical direction in this way, but from one end portion during mold release, little or no tensile force is exerted between the upper and lower molds and the glass substrate molded object. Therefore, it is possible to mold release while preventing the molded object or the mold from being damaged. Also, during mold release, and particularly at the beginning of the mold release the upper mold 11 operates, such that, the lower edge portion 23 of the side portion of the upper mold 11 moves to the right in the figure while it is sliding on the upper surface of the glass material 22, and therefore, the mold release characteristics are improved.

In this respect, the direction of grooves formed on the surface of the glass material 22 is preferably in a mold release direction, that is, parallel to a line (direction) connecting the engaging projected piece 20 of the upper mold 11 with the end portion on the other side thereof, in terms of preventing the glass substrate molded object or the mold from being damaged. Further, this is also preferable in terms of improvement in mold release characteristics.

Figure 5:
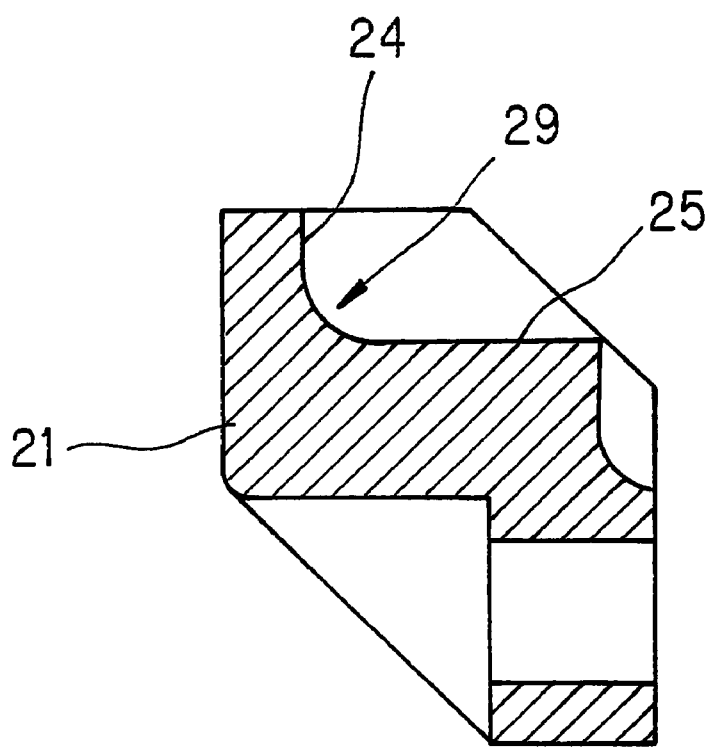
FIG. 5 is a cross-sectional view showing another example of an engaging projected piece supporting portion.

Also, a corner portion 29 ranging from the side portion 24 to the base 25 of the engaging projected piece supporting portion 21 is preferably formed in a radius (R) shape as shown in FIG. 5 in order to smoothly retract the upper mold 11.

Further, in the present invention, air is blown between the upper mold and the lower mold after press molding, in order to improve the mold release characteristics. Therefore, it is preferable to adopt the press mold structure according to the present invention and to also perform this blowing of air. In addition, the blowing of air operates to cool the mold, resulting in a shortened cycle time of the re-heat press.

This air blowing method is normally performed from the side of the mold, and its effect may be increased by blowing air from all four directions of the mold. In this respect, even if air is blown from one direction of the mold, the effect can be exhibited as a matter of course.

The description will be made of the pressing method according to the present invention.

As shown in FIG. 1, through the pressure shaft 13 of the pressure means, the pressure member 16 and the pressure intermediate plate 15 with respect to the upper mold 11, and through the pressure shaft 14 of the pressure means, the coupling member 28 and the lower surface plate 19 with respect to the lower mold 12, mold clamping pressure is applied from the upper limit direction to press mold a plate-shaped glass substrate having a predetermined thickness between the upper mold 11 and the lower mold 12.

When, however, the glass substrate molded object becomes larger, the mold also becomes larger as an inevitable consequence, and the pressure to be applied to the entire mold is increased. When the pressure applied to the entire mold is thus increased, variance occurs in the pressure applied onto the mold surface between the upper mold 11 and the lower mold 12. Variance in pressure causes variance in the moldability within the mold, thus adversely affecting the quality of the glass substrate molded object.

Thus, according to the present invention, pressure variance on the mold surfaces between the upper mold 11 and the lower mold 12 is detected, and a buffer 30 is inserted and arranged between the lower mold 12 and the lower surface plate 19 in a position corresponding to the mold surface portion at lower pressure to uniformize the mold clamping pressure.

As the buffer used in the present invention, there is used one made of material having lower compressive yield strength than the material constituting the lower mold.

That is, when press pressure is applied to the upper and lower molds, compressive stress is exerted on each of the buffer 30, the upper mold 11 and the lower mold 12. At this time, since the buffer 30 has lower compressive yield strength than the material constituting the lower mold 12, the buffer 30 is crushed earlier than the lower mold 12 to absorb the compressive strain, and prevents the mold from being deformed. The pressure is uniformly applied to the entire mold surface of the mold, thus making it possible to obtain an excellent quality of plate-shaped glass substrate molded object.

As the material for the buffer, one made of material which is more flexible than the mold or materials used for the surrounding members and which is difficult to change depending on temperature is suitable. Generally, heat resisting steel, ultra high strength steel or the like is used for the mold material, and concretely a stainless steel (SUS) system of members are preferable.

As the shape of the buffer, a stitch type plate which loses its shape in proportion to pressure applied, or a narrow strap-shaped plate is preferable, and this is preferably interposed between the lower mold 12 and the lower surface plate 19 or between the lower surface plate 19 and the coupling member 28.

As described above, according to a press mold and a pressing method of the present invention, it is possible to prevent a molded object or a mold from being damaged during mold release, and to apply uniform pressure on the entire mold surface by eliminating pressure variance on a mold surface of the mold as far as possible, and therefore, a large glass substrate molded object of excellent quality can be molded.

What is claimed is:

1. A press mold for a glass substrate, comprising an upper mold and a lower mold, and a pressure means for applying pressure to said upper mold and said lower mold, wherein said pressure means enables molding of a plate shaped glass substrate having a predetermined thickness between said upper mold and said lower mold, wherein an engaging projected piece is projectingly provided on a side portion of said upper mold, an engaging projected piece supporting portion for supporting said engaging projected piece is provided on a side portion of said lower mold, and an end portion of said upper mold is formed so as to be released from said lower mold with said engaging projected piece serving as a rotating shaft, wherein said engaging projected piece supporting portion does not fix the engaging projected piece.

2. The press mold for glass substrate according to claim 1, wherein
    said pressure member is arranged above said upper mold with a pressure intermediate plate interposed therebetween, and a central upper surface of said pressure intermediate plate is formed into a concave shape, and a spherical seat formed into such a convex shape as to correspond to the concave shape in said pressure intermediate plate is provided on a central lower surface of said pressure member.

3. The press mold for glass substrate according to claim 1, further comprising means for blowing air between said upper mold and said lower mold, on the side of said mold, which blows air between said upper mold and said lower mold after press molding.

* * * * *